United States Patent [19]

Weiler

[11] Patent Number: 5,374,263
[45] Date of Patent: Dec. 20, 1994

[54] FULL WITHDRAWAL CONTAINER AND METHOD

[75] Inventor: Gerhard H. Weiler, Woodstock, Ill.

[73] Assignee: Automatic Liquid Packaging, Woodstock, Ill.

[21] Appl. No.: 959,740

[22] Filed: Oct. 13, 1992

[51] Int. Cl.$^5$ .................... A61B 19/00; A61M 5/32
[52] U.S. Cl. ........................... 604/403; 604/411
[58] Field of Search ............ 604/243, 244, 240, 403, 604/411, 412, 414, 415, 905, 257, 258; 141/329, 383, 330, 382, 384, 386

[56] References Cited

U.S. PATENT DOCUMENTS

| | | | |
|---|---|---|---|
| 3,030,952 | 4/1962 | Elder | 604/414 |
| 3,368,592 | 2/1968 | Thiel et al. | 141/383 |
| 3,482,572 | 12/1969 | Grosclaude et al. | 604/244 |
| 4,161,949 | 7/1979 | Thanawalla | 604/905 X |
| 4,187,846 | 2/1980 | Lolachi et al. | 604/905 X |
| 4,607,671 | 8/1986 | Aalto et al. | 141/383 |
| 4,731,061 | 3/1988 | Matkovich | 604/244 X |
| 4,787,429 | 11/1988 | Valentini et al. | 604/411 X |
| 5,092,854 | 3/1992 | Black | 604/905 X |

FOREIGN PATENT DOCUMENTS

| | | | |
|---|---|---|---|
| 3737665 | 5/1989 | Germany | 604/905 |
| 8601712 | 3/1986 | WIPO | 604/412 |

Primary Examiner—C. Fred Rosenbaum
Assistant Examiner—Frank Wilkens, III
Attorney, Agent, or Firm—Jack E. Dominik

[57] ABSTRACT

A container having a neck with a non-tapered cylindrical upper drain portion, and a frictional interference fit collar type gripper for the withdrawal member is disclosed which results in tight interference fit. Also total effective withdrawal of the contents of the container is promoted by providing a ring like stop or seat at the bottom of the neck. The construction also will accommodate flaws and defects in the manufacture of the withdrawal member or the drain portion resulting from scratches which will otherwise permit leakage upon withdrawal of the contents. The method of the present invention is directed to manufacturing the container by which the mandrel for insertion in the neck has a lower end portion providing a seating ring, and an upper portion defining the interior portion, with an interference collar protruding inwardly in a portion spaced from the lower end portion. The radius and draft angle permits the mandrel to be withdrawn from the molded plastic product without deforming or damaging the same, but only after the neck of the container including an internal interference fit collar has been shaped.

8 Claims, 2 Drawing Sheets

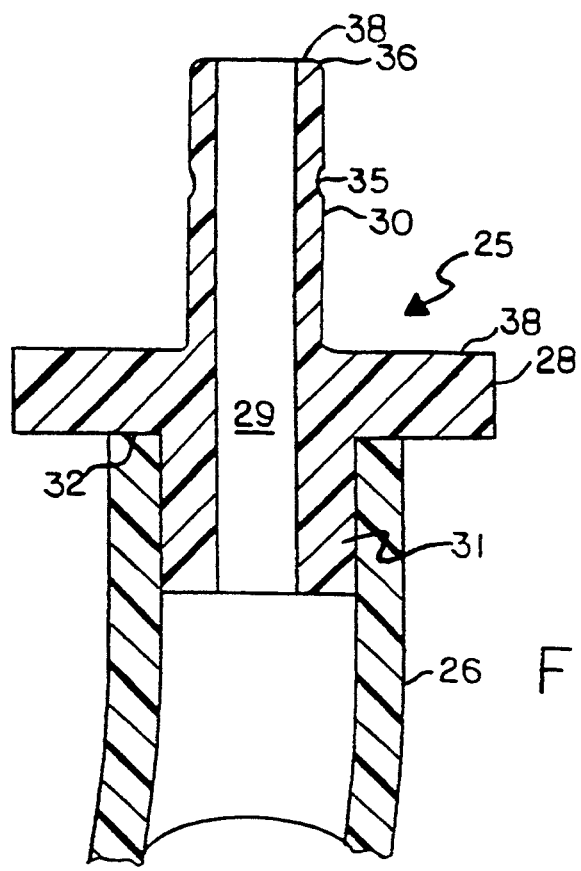
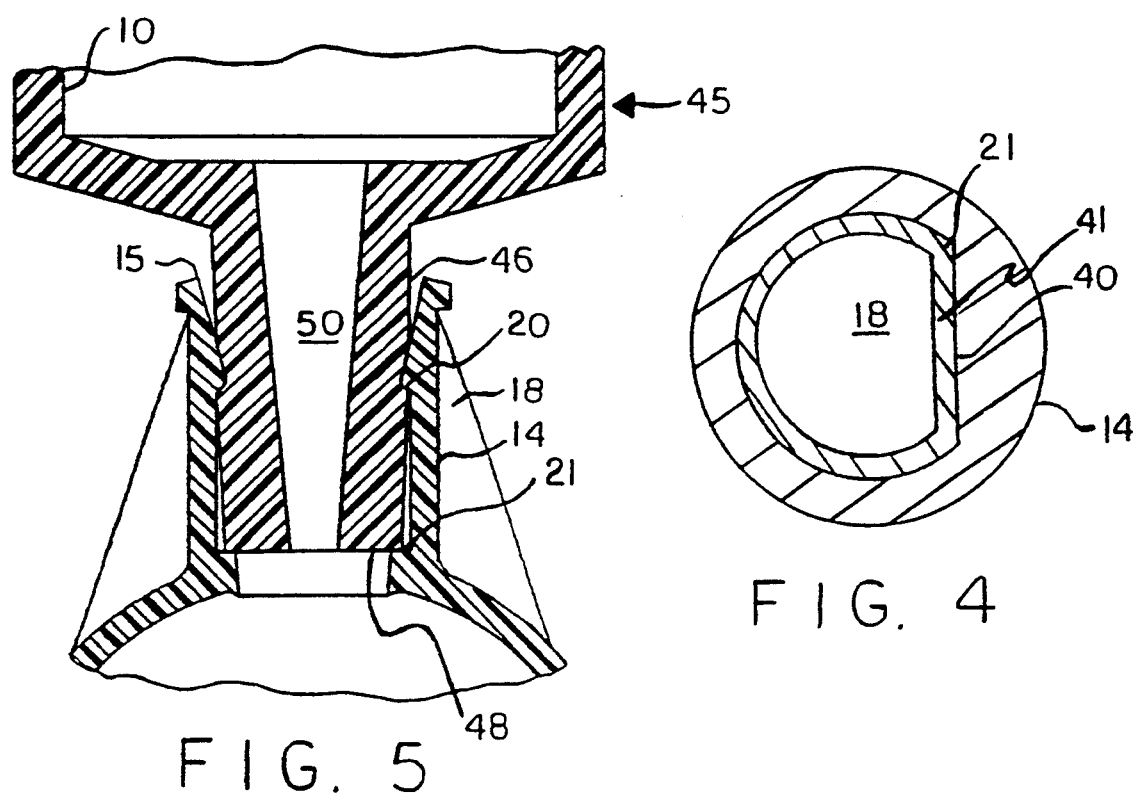

FULL WITHDRAWAL CONTAINER AND METHOD

FIELD OF THE INVENTION

The present invention relates to sealed containers usually for sterile storing and dispensing of fluids. The size of the container can vary from 0.4 milliliters to 500 milliliters or more. The containers may contain an injectable serum, intravenous fluids, fluid for use in diagnostics, and other fluids. Specifically, the apparatus relates to forming the container neck to receive a withdrawal insert sealed to the neck which can also accomplish full withdrawal. The method relates to forming the container and the sealed withdrawal of fluids from the containers.

SUMMARY OF THE PRIOR ART

The prior art is exemplified by U.S. Pat. No. 4,643,309 and U.S. Pat. Nos. 4,540,542, 4,239,726 and 4,298,045 where all relate to withdrawing a fluid from a container. Invariably the containers of U.S. Pat. No. 4,643,309 accept a syringe tapered conical end engaged by a tapered female recess in the neck of a vessel or vial, and the two are related by a friction fit of zero tolerance as to the tapered angle of each, most normally being approximately 2°. With the larger containers as shown in U.S. Pat. No. 4,239,726 and U.S. Pat. No. 4,298,045 a tapered spike withdraws the fluid from a tapered conical opening.

The disadvantages of such tapered inserts are numerous. First, the fit is along a frustoconical surface such as the upper two-thirds of a cone which fits into a container which is comparable to the upper two-thirds of another cone. Second, the fit is frictional and not interference which could permit leakage. Third, the inserts are of varying lengths and extend into the container beyond the neck and hence cannot achieve maximum or effective total withdrawal. The fit is, therefore, frictional and that of a repository as distinguished from lockingly engaged by a predetermined interference seal. In addition, with the type of a vial as illustrated in U.S. Pat. No. 4,643,309 there is no provision for determining accurately the depth to which the insert is inserted into the container. If the insertion is not predetermined, the extent of the insertion may be longer or shorter than that desired. Also when inverted, leakage can occur. If the tip of the withdrawal insert penetrates the container beyond its neck, some fluid may be trapped and cannot be withdrawn.

Therefore, what is highly desired is a container which is formed to accept a withdrawal insert which will guide the same into position and secure it with a tight seal that will overcome leaks attributable to scratches that may occur in the manufacturing process or in the insertion process. The structure should also insure that the withdrawal member is inserted to a given position so that in withdrawing the solution effectively the entirety of the contents will be withdrawn. In addition, the above should be achieved through a manufacturing process in which conventional blow molding and/or blow/fill seal equipment is employed.

SUMMARY OF THE INVENTION

The present invention is directed to the discovery that by providing a neck of a container with a non-tapered cylindrical upper drain portion, and a frictional interference fit collar type gripper for the withdrawal member results in tight interference fit. Also total effective withdrawal of the contents of the container is promoted by providing a ring like stop or seat at the bottom of the neck. In essence, a double seal is achieved with the further advantage of total withdrawal of the contained fluid. The construction also will accommodate flaws and defects in the manufacture of the withdrawal member or the drain portion resulting from scratches which will otherwise permit leakage upon withdrawal of the contents. The method of the present invention is directed to manufacturing the container by which the mandrel for insertion in the neck has a lower end portion providing a seating ring, and an upper portion defining the interior portion, with an interference collar protruding inwardly in a portion spaced from the lower end portion. The radius and draft angle permits the mandrel to be withdrawn from the molded plastic product without deforming or damaging the same, but only after the neck of the container including an internal interference fit collar and ring seat have been shaped.

BRIEF DESCRIPTION OF THE DRAWINGS

Further objects and advantages of the present invention will become apparent as the following description of an illustrative embodiment takes place, as set forth in the accompanying illustrative drawings, in which:

FIG. 3 is also an enlarged cross-sectional view of a plug and tube used to insert into the container neck of FIG. 2;

FIG. 4 is a transverse sectional view taken alone section line 4—4 of FIG. 2 showing an alternative embodiment in which a flat is employed in order to orient the insert; and FIG. 5 is another transverse sectional view showing the subject container neck, but used in conjunction with a conical Luer tip made in accordance with American National Standard NC/HIMA MD 70.1-1983.

DESCRIPTION OF A FIRST EMBODIMENT

Figure 1:
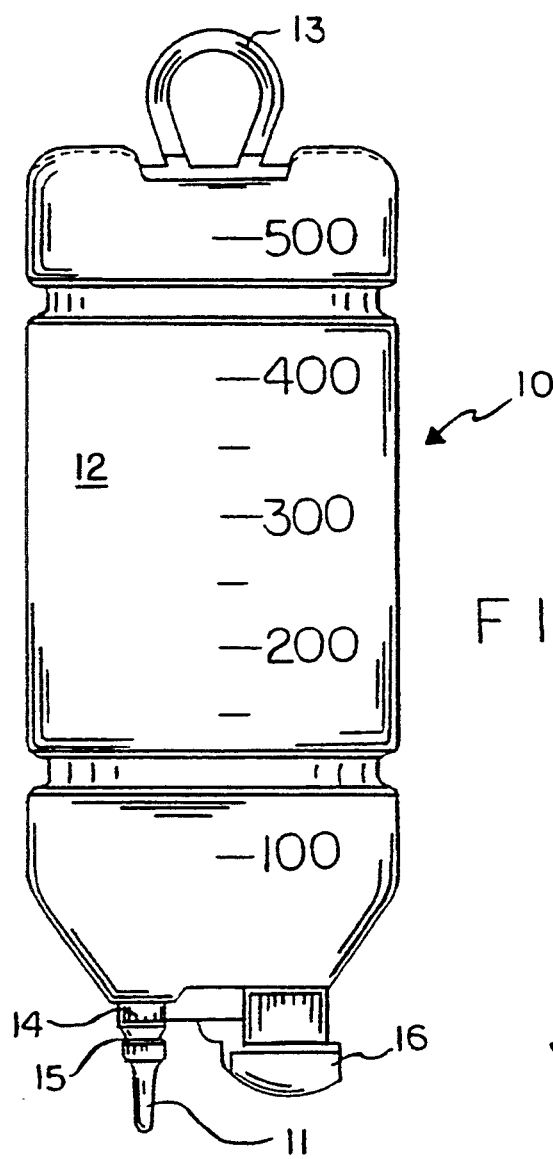
FIG. 1 is a front elevation view of a typical intravenous solution dispenser in which the present invention finds utility.

The first embodiment of the present invention is shown in conjunction with a container 10 as it appears in FIG. 1. The container 10 is provided with a seal tab 11, a body portion 12, and a hanger 13. The seal tab 11 is secured to the body neck 14 by means of a frangible web 15. In opening, the seal tab is torn away from the neck 14 when the frangible web 15 is broken.

More specifically, the container 10 is hermetically sealed and normally has a plurality of removable closures for containing and dispensing sterile solutions. The removable closures 11, 16 are unitary with the container 10. The container 10 comprises a sealed elongated shell or body 12 of a thermoplastic material which has at least one access port at each end of the shell, a neck portion unitary with the shell and surrounding each access port, and a removable cap structure over the access ports and joined to the corresponding neck portions by means of frangible annular webs such as illustrated by reference numeral 15 and removable closure 11. The frangible annular web 15 is unitary with the removable cap 11 and the neck portion 14. At least one of the neck portions is provided with a bore of predetermined controlled dimensions and is adapted to receive a draining spike or a similar means for withdrawing the contents of the container. In the embodiment shown in FIG. 1, I.D. control port 14 is provided and is made accessible by removing the cap 11 when the frangible web 15 is broken.

Figure 2:
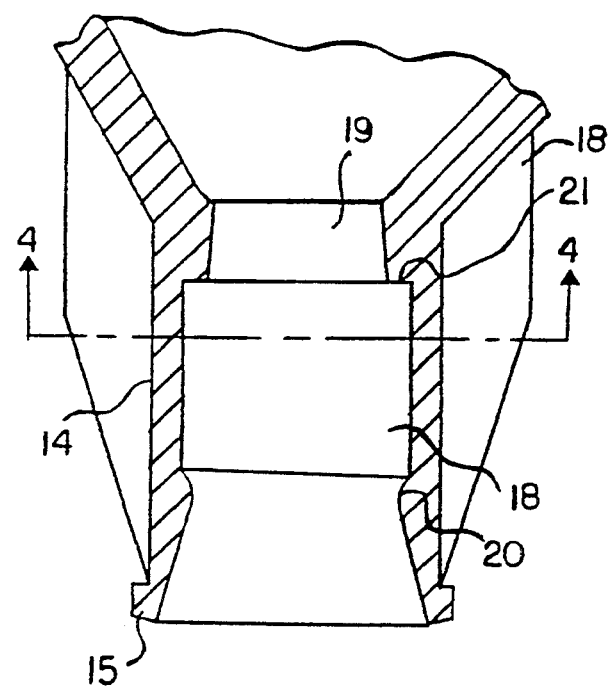
FIG. 2 is an enlarged cross-sectional view of the neck portion of the withdrawal element of the container shown in FIG. 1 in enlarged view.

Turning now to FIG. 2, it will be seen that the neck 14 terminates at the frangible web 15 at its lower portion as shown in FIG. 2. Reinforcing web 18 is provided to strengthen the neck 14 where it joins the body 12 of the container 10. Interiorly and in accordance with the invention provision is made for an interference collar 20 and a seating ring 21.

In order to withdraw fluid through the initial opening aperture 19, a plug 25, as shown in FIG. 3 is employed. The plug 25 is secured to a withdrawal tube 26 which is press fittingly positioned over the plug tube insert 31 and the tube 26 abuts the tube in seat 32 on the control ring 28. The neck insert 30 has an upper surface 38 which is a seating ring face. It engages the portion of the neck 14 from which the frangible web 15 (see FIG. 2) has been removed. The plug 25 is provided with an aperture 29 which traverses the control ring 28. A neck 35 is provided in the neck insert 30 to nestingly and interference fittingly engage the interference collar 20 of the container neck 14 shown in FIG. 2. The neck insert end 36 of the plug 25 has a sealing ring face 38 which is snugly positioned, when inserted, against the seating ring 21 of the neck 14.

A modification as shown in FIG. 4 is available where it is desired to orient the insert into the neck 14 of the container 10. There it will be seen that this orientation is provided by means of a flat 40 interiorly with the neck which engages a flat 41 on the insert.

Alternative Embodiment

The flexibility and adaptability of the present invention is illustrated in FIG. 5 where the container 10' may be smaller than container 10 of FIG. 1, such as 0.4 milliliters or larger. It is utilized with a Luer slip fitting 45 such as identified in American National Standard and C/HIMA MD 70.1-1983. The Luer slip fitting 45 is provided with a Luer conical tip 46 and has a Luer tip end 48. Upon inserting the Luer conical tip 46 into the neck 14 an interference is occasioned by the dimensional provisions for the interference collar 20. Once the Luer conical tip 46 is fully inserted to where the Luer tip end 46 sits on top of the seating ring 21, it is ready to withdraw the fluid from the container 10.

When withdrawal does take place, the container can be held horizontally, but ultimately tipped upward toward the vertical to the end that all of the contents will flow into the aperture 50 of the conical Luer tip 46. At the same time, not only is full withdrawal assured, but sealing between the container and the Luer slip fitting 45 is insured at two portions, firstly where the end 48 of the Luer tip seats on the seating ring 21, and secondarily where the interference fit is provided by the circumferential locking between the interference collar 20 and the Luer conical tip 46.

Dimensions and Proportions

While dimensions do not necessarily form a part of the invention, they do illustrate the problems surrounded by the invention and how they were solved, and also the various proportions. The dimensions are not intended to be limiting, but rather exemplary of certain commercial adaptations. The dimensions also form a frame of reference for gaging proportions. The commercial type container 10 shown in FIG. 1 has a 500 milliliter capacity. The dimension from the median portion of the interference collar 20 to the seating ring 21 is 4 millimeters (0.15 inches). Hereinafter all dimensions will be given in millimeters with parenthetical notes on the English dimension thereafter. Continuing with the dimensions, it will be seen that the interior narrow dimension of the interference collar 20 is 3.962 millimeters (0.156).

Turning now to the dimensions of the plug 25, the neck insert is 4.293 millimeters (0.169) and the depth of the neck 35 gives it a diameter of 4.039 millimeters (0.159) thus insuring an interference fit of 0.77 millimeters. The distance from the ring seat face 38 of the neck insert 30 to the center of the neck 35 is identical with the counterpart dimension in the neck 14 of the container 10. The plug 25 diameter can be readily increased to twice or more the dimension set forth.

Turning now to FIG. 5, the dimensions of the distance between the interference collar 20 and the seating ring 21 are identical to that shown in the embodiment of FIG. 2, with the exception that the overall distance from the seating ring 21 to the frangible web end portion 15 of the neck 14 is 6.350 millimeters (0.250). It will also be appreciated that the dimensions are in part controlled by the ANSI standard for the Luer slip fitting ANSI/NIMAND70.11983.

The constriction portion of the sealing collar 20 is 3.962 millimeters (0.156), the same as with the embodiment of FIG. 2, providing for a snug interference fit. Where the conical Luer tip end 48 seats upon the seating ring 21, the outside diameter of the Luer tip end 48 is 4.027 millimeters (0.1585) whereas the interior diameter of the seating ring 21 is 4.293 millimeters (0.169) thus providing for a gap of 0.166 millimeters to insure that the conical tip engages only the interference collar 20 and not the balance of the conical surface of the conical Luer tip 46. This insures a very tight interference fit between the interference fit collar 20, and the conical Luer tip 46. Also, when the end 48 of the conical Luer tip 46 is seated on the seating ring 21, the collar not only provides a second seal, but also a dimensional "jig" whereby the Luer tip end 48 is held snugly and vise-like against the seating ring 21 in further fluid sealed engagement.

In operation, the embodiment of FIG. 5 is very comparable to that of FIGS. 1-3 in that the insert is positioned interiorly of the neck until its end is secured against the seating ring 21. Thereafter, the contents are withdrawn, and towards the end of the withdrawal, the container is held horizontally or inverted if need be in order to accomplish full withdrawal of the contained solution. After full withdrawal, the insert is removed.

The Method

The method of the present invention, from a standpoint of forming the container 10 is disclosed and described in applicant's earlier U.S. Pat. No. 4,239,726, more specifically as illustrated in FIGS. 7-10 thereof. While the same method is employed in forming the container and the neck, it is modified to the extent that the mandrel is formed so that its cross-section is the same as the aperture 18 but recessed in order to form the interference collar 20. Also the lower end of the mandrel is dimensioned to form the seating ring 21. The same are proportioned to permit the mandrel, despite its interfering fit with the neck 14, to withdraw from the aperture 18 without disturbing the configuration of the already-formed interference collar 20 and the seating rings 21.

Summary

In the use of the container 10, 10' the seal tab 11, which is common to both constructions shown, is removed and thereafter the plug 25 which is used with a tube 26 is inserted or Luer tip cone 46 of a syringe. With both the plug 25 or, Luer tip 48 inserted and pressed into position to a point where their respective ends and the seat engaging ends bottom out on the seating ring 21. This step is important because once the relationship between the end of the withdrawal instrument and the seating ring is established as to physical contact, when the container is inverted the entire contents have no other place to go than into syringe or the plug or the tube. This insures effective total withdrawal of the fluid while at the same time employing an absolute interference fit seal around the body portion of the withdrawal instrument. A further and related aspect of the invention as shown in FIG. 4 relates to positioning a flat or otherwise providing for an asymmetrical withdrawal instrument to the end that positive orientation may be made of the withdrawal instrument since it can only be inserted in one given orientation.

Although particular embodiments of the invention have been shown and described in full here, there is no intention to thereby limit the invention to the details of such embodiments. On the contrary, the intention is to cover all modifications, alternatives, embodiments, usages and equivalents as fall within the spirit and scope of the present invention, specification and appended claims.

What is claimed is:

1. A container formed of a material for containing a sealed solution, said container having a body, said body having an upper end with a removable seal tab, and a neck, the improvement comprising:
    said neck having a unitary formed upper and lower end, an inner aperture of essentially circular cross-section from one end of the neck to the other,
    a removable seal tab above the upper end portion, said removable seal tab leaving an upper open end when removed,
    an interior collar with an interference between of at least 0.001" per side formed at a preselected o-portion between the upper and lower portion of the neck aperture of said open portion for receiving a withdrawal element in interference fit relationship,
    and a sealing ring formed at the lower end of the neck to sealingly engage the end of a withdrawal element thereby insuring full withdrawal of the sealed solution after the interior collar secures the withdrawal element against the sealing ring.

2. For use with the container of claim 1,
    a plug,
    said plug having an outwardly extending control ring at a mid-portion,
    a tube insert and a neck insert having apertures and extending from opposite sides of the control ring,
    and a collar neck on the neck insert proportioned for a force fit with the container neck collar.

3. The method of withdrawing fluid from a container having an upper end neck with a cylindrical barrel for receiving a withdrawal instrument, and having an interior unitarily formed collar proportioned for an interfering continuous fit at a mid-portion of the cylindrical barrel with the Luer tip of a syringe, and having a unitarily formed seating ring at the lower portion of the cylindrical barrel and immediately adjacent the body portion of the container, whereby said collar, seat, and neck are all unitarily formed, comprising the steps of:
    a seating ring at the lower portion of the cylindrical barrel and immediately adjacent the body portion of the container said collar, seat, and neck all being unitarily formed,
    inserting a withdrawal instrument Luer tip syringe without a needle into the container neck by force fittingly advancing it until the end is moved in contact with the seating ring of the container and a mid-portion is firmly engaged by the collar having an interfering fit,
    and thereafter at least partially inverting the container to a point where the entire contents of the container will flow to the neck portion of the container, and withdrawing the fluid until no further fluid is left to withdraw.

4. A container formed of a material for containing a sealed solution, said container having a body portion, an upper outer end portion with a removable seal tab, and a neck, the improvement comprising:
    said neck having unitary upper outer and lower ends, and an inner open portion of essentially tubular cross-section from one end to the other,
    a removable seal tab above the upper end portion,
    and a collar with an interior interference tolerance of at least 0.001" per side at a mid-portion of said open portion for sealingly receiving a withdrawal element.

5. In the vial of claim 4,
    a seating ring at the lower neck portion of the container beneath the collar to firmly seat the end of the withdrawal instrument.

6. The method of withdrawing fluid from a vial or container having an upper end neck with a cylindrical barrel for receiving a withdrawal element, and having a collar proportioned for an interfering fit with the withdrawal element at a mid-portion of the cylindrical barrel and having a seating ring at the lower portion of the cylindrical barrel and immediately adjacent the body portion of the container all of which are unitarily formed in the neck comprising the steps of:
    inserting a withdrawal element into the container neck by force fittingly advancing it beyond the collar until the end contacts the seating ring of the container,
    and thereafter partially inverting the container to a point where the entire contents of the container will flow to the neck portion of the container, and withdrawing the fluid until no further fluid is left to withdraw.

7. A container formed of a material for containing a sealed solution, said container having a body portion, an upper end portion with a removable seal, and a neck portion, the improvement comprising:
    said neck having a unitary formed upper and lower end, an inner aperture of similarly shaped cross-section from one end of the neck to the other,
    a removable seal tab above the open portion,
    said neck having an interior collar with an interference tolerance of at least 0.001" per side formed at a preselected portion between the upper and lower portion of the neck aperture of said open portion for receiving a withdrawal element in interference fit relationship, and a seating ring formed at the lower end of the neck portion to sealingly engage the end of a withdrawal element thereby insuring full withdrawal of the sealed solution after the interior collar secures the withdrawal element against the seating ring.

8. A container formed of a material for containing a sealed solution, said container having a body portion, an upper end portion with a removable seal tab, and a neck, the improvement comprising:

said neck having unitary upper outer and lower ends, and an inner open portion of similarly shaped cross-section from one end to the other, said removable seal tab above the upper end portion, and a collar with an interior interference tolerance of at least 0.001" per side at a mid-portion of said open portion for sealingly receiving a withdrawal element.

* * * * *